United States Patent
Saad

(10) Patent No.: US 10,819,738 B2
(45) Date of Patent: Oct. 27, 2020

(54) DETECTING AND PROTECTING AGAINST RANSOMWARE

(71) Applicant: EMC IP Holding Company LLC, Hopkinton, MA (US)

(72) Inventor: Yossef Saad, Gannei Tikva (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 231 days.

(21) Appl. No.: 16/138,034

(22) Filed: Sep. 21, 2018

(65) Prior Publication Data

US 2020/0099699 A1   Mar. 26, 2020

(51) Int. Cl.
| | |
|---|---|
| *H04L 29/06* | (2006.01) |
| *G06F 21/55* | (2013.01) |
| *G06F 21/56* | (2013.01) |
| *G06F 3/06* | (2006.01) |
| *H03M 7/30* | (2006.01) |
| *G06F 11/30* | (2006.01) |

(52) U.S. Cl.
CPC .......... *H04L 63/145* (2013.01); *G06F 3/061* (2013.01); *G06F 3/065* (2013.01); *G06F 3/067* (2013.01); *G06F 3/0641* (2013.01); *G06F 11/3034* (2013.01); *G06F 21/554* (2013.01); *G06F 21/56* (2013.01); *H03M 7/3086* (2013.01); *G06F 2201/81* (2013.01)

(58) Field of Classification Search
CPC . H04L 63/145; H04L 63/1416; G06F 21/554; G06F 21/56; G06F 3/065; G06F 3/067; G06F 3/061; G06F 11/3034; G06F 3/0641; G06F 2201/81; H03M 7/3086; H03M 7/3091; H03M 7/30
See application file for complete search history.

(56) References Cited

U.S. PATENT DOCUMENTS

| | | | | |
|---|---|---|---|---|
| 10,055,582 | B1* | 8/2018 | Weaver | G06N 20/00 |
| 10,121,003 | B1* | 11/2018 | Adams | G06F 21/565 |
| 10,229,269 | B1* | 3/2019 | Patton | G06F 21/566 |
| 2018/0075234 | A1* | 3/2018 | Boutnaru | G06F 21/554 |
| 2018/0159866 | A1* | 6/2018 | Sheri | G06F 21/566 |
| 2018/0189488 | A1* | 7/2018 | Arora | G06F 8/71 |
| 2018/0307839 | A1* | 10/2018 | Bhave | G06F 21/566 |
| 2018/0322280 | A1* | 11/2018 | Borlick | G06F 21/554 |
| 2018/0322281 | A1* | 11/2018 | Borlick | G06F 21/562 |
| 2019/0108340 | A1* | 4/2019 | Bedhapudi | G06F 16/1734 |
| 2019/0109869 | A1* | 4/2019 | Bailey | H04L 9/14 |
| 2019/0121978 | A1* | 4/2019 | Kraemer | G06F 21/566 |

* cited by examiner

*Primary Examiner* — Matthew Smithers
(74) *Attorney, Agent, or Firm* — Barry N. Young

(57) ABSTRACT

In a system that replicates data writes by a server to form a local copy for a local production site with local storage and a remote copy for a remote recovery site having remote storage, ransomware is detected by a decrease of more than a predetermined threshold in either or both of compression ratio or deduplication ratio in a length of data selected by a sliding time window. Upon detecting ransomware, data writes to said remote storage are stopped to minimize corruption of the remote data.

20 Claims, 4 Drawing Sheets

DETECTING AND PROTECTING AGAINST RANSOMWARE

BACKGROUND

This invention related generally to systems and methods for the detection and prevention of malware, and more particularly to detecting and protecting against ransomware in enterprises.

Ransomware is a type of malicious software ("malware") which takes control of a computer system usually by encrypting the computer system's data and blocking access to the data unless a ransom is paid. A ransomware attack typically occurs in multiple stages. Initially, malicious code is implanted into a user's machine, typically by a "Trojan" file which is disguised as a legitimate file that the user is tricked into downloading or opening when it arrives as an email attachment, or which is transferred automatically without user action between computers in a network. At a certain point, this malicious code starts encrypting all of the computer system data files, rendering them inaccessible, while deleting the original unencrypted data files to prevent recovery of the data. The user may also be faced with a splash screen ordering him to visit a specified email address and pay a ransom (usually in a digital cryptocurrency such as Bitcoin) to have the files decrypted. Recovering the encrypted files without the decryption key is typically an intractable problem, and the difficulties in tracing the digital currencies used for paying the ransom makes finding the perpetrators unlikely. Even if the ransom is paid, there is still no assurance that the encrypted data can be recovered.

Large commercial enterprises as well as governmental organizations are particularly vulnerable to ransomware attacks. Over the past several years, there have been a number of well-publicized ransomware attacks against such enterprises and organizations, and these attacks have cost the enterprises and organizations millions of dollars because of payments to perpetrators and because of data loss and disruptions in operations.

One characteristic of encryption-type ransomware is that it generates significant amounts of input/output (I/O) traffic on a user's machine, since all of the data is being read from disks, encrypted and rewritten back to disks. Thus, one possible way of detecting a ransomware attack is to detect abnormal I/O activity and to alert the user as to a potential attack. There are some tools that run in host machines that can detect abnormal I/O activity and issue an alert, and these could be used to detect a ransomware attack. Unfortunately, high I/O traffic may have many different causes unrelated to ransomware, so that high traffic is not necessarily indicative of ransomware. Furthermore, the tools that detect abnormal I/O activity require special installation and knowledge, and, thus, are not frequently used.

Other known approaches include installing ransomware detection utilities in application hosts, or as part of a backup system. However, installing utilities in application hosts requires special installation of the detection utility in every host, which is complex to manage and resource intensive in large systems. Installing utilities in a backup system is not very effective since this approach does not operate in real time. Furthermore, back up is typically performed only periodically, usually no more than once a day. Therefore, ransomware could render a whole day's work unusable. Thus, this approach is not very effective in minimizing damage.

There is a need for systems and methods capable of quickly detecting and protecting against data loss due to ransomware attacks in real time before significant damage can occur, and without requiring special installations in each workload. It is desirable to provide systems and methods that address these and other known problems associated with ransomware, and it is to these ends that the invention is directed.

DESCRIPTION OF PREFERRED EMBODIMENTS

The invention is particularly well adapted to run on a computer system of an enterprise's IT department, and will be described in that context. As will be appreciated, however, this is illustrative of only one utility of the invention and it may also run on other types of computer systems and in other types organizations.

As will be described, in one aspect the invention may monitor data write operations to production storage systems as they are initiated and replicate the data writes to a recovery site that enables recovery of the data in the event of a disaster. The invention may analyze certain parameters in a data storage and replication process to detect unintended and unauthorized encryption of the data that indicates a possible ransomware attack. Once a ransomware attack is identified, the invention may automatically take action to prevent proliferation of the attack. As by issuing alerts and by preventing changes to the data at the recovery site. In some situations it may also prevent changes to data at the local (production) site.

In another aspect, the invention may analyze previously written data at the production and recovery sites to detect unintended encryption, indicative of a ransomware attack, and, upon detecting such encrypted data, prevents further write operations and data changes.

Figure 1:
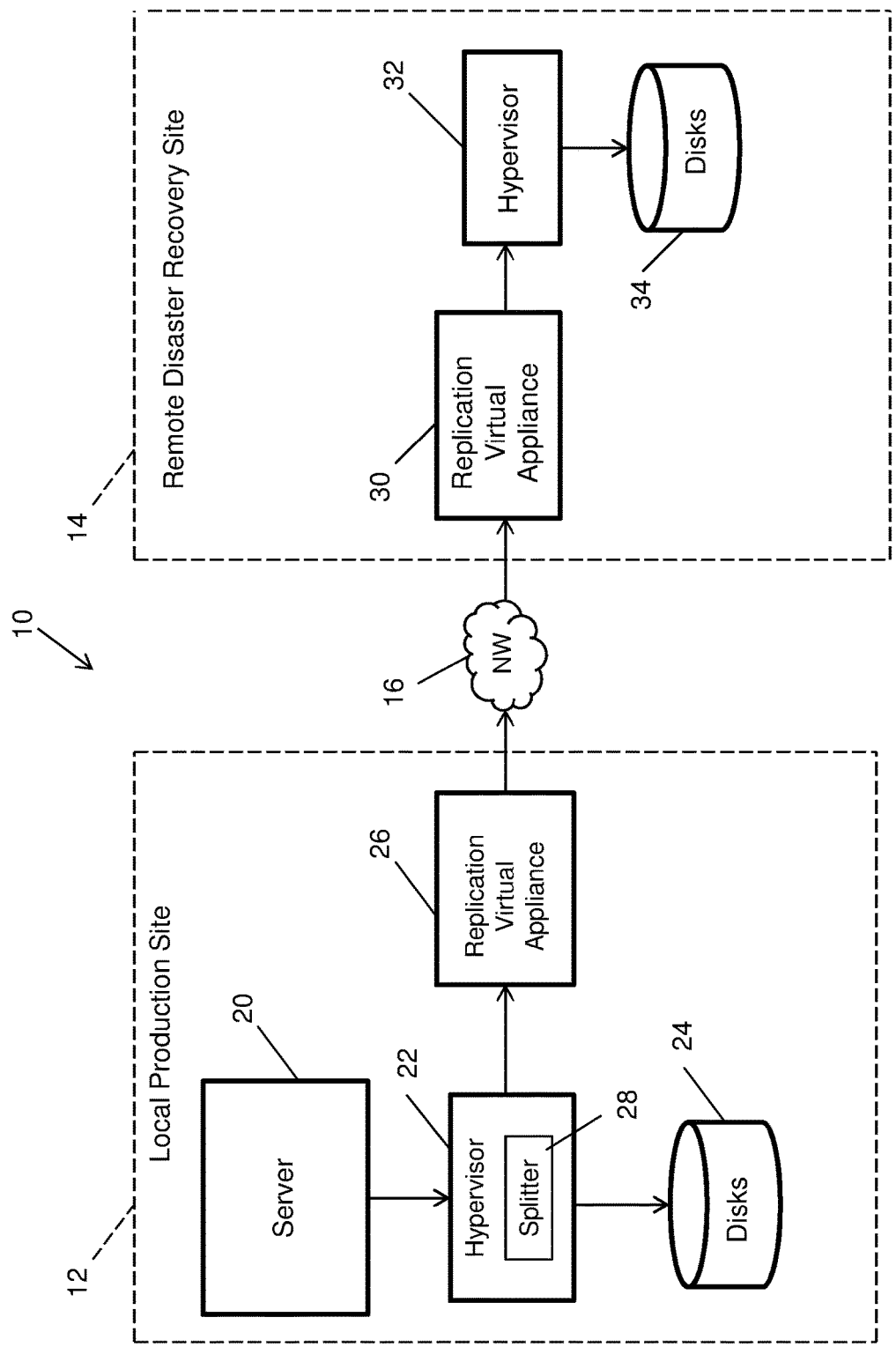
FIG. 1 is a diagrammatic view of an embodiment of a system in accordance with the invention for detecting and preventing ransomware.

FIG. 1 is a diagrammatic view of part of an enterprise computer network 10 in which the invention may be embodied to detect the occurrence of and prevent a ransomware attack. As shown in the figure, the network 10 may include a first local production site computer system 12 and a second remote disaster recovery site computer system 14 connected by a network 16. Network 16 may be a local area network (LAN) or a wide area network (WAN), and computer network 10 may be distributed portions of a larger enterprise computer system.

The first computer system 12 at the local production site may comprise a server 20 connected by a hypervisor 22 to disks 24 of a storage system. It may be "local" in the sense that it is local to a data center of the enterprise, or it may be part of a storage and processing network of a larger distributed system of the enterprise. The hypervisor 22 may also connect the first computer system to the network 16 through a replication virtual appliance 26 which will be described more fully below.

The second computer system 14 may be at a remote disaster recovery site that may be either physically co-located with but a separate system from the local production site, or may be a geographically remote site such as, for instance, being in a cloud. As shown, the remote disaster recovery site may comprise another replication virtual appliance 30 that interfaces the remote site to the network 16, and may comprise a hypervisor 32 that interfaces to disks 34 of a remote storage system. Disks 34 may be part of a distributed storage system.

As will be described below, the first and second computer systems 12 and 14 may be formed to cooperate to store primary data of the enterprise in the production site storage disks 24, and to replicate that primary data and store the replicated data in the recovery site storage disks 34. These systems may be components, for example, of a Recover-Point system of Dell/EMC, the Assignee of the present invention and of a continuous data protection mechanism of the Assignee which replicates writes to the production storage system and stores them in the recovery storage system with a log journal of data changes to enable recovery to any point in time.

In an embodiment, the first and second systems 12 and 14 may comprise virtual computer systems. Server 20 of the local production first system 12 may be a virtual server that handles write operations to disks 24 of the production site. It may comprise one or more virtual machines and associated memory that stores executable instructions for controlling its operations and those of the virtual machines. It receives data from a source, such as a client user, and writes the data to disks 24 through the hypervisor 22. After writing, the disks 24 return an acknowledgment ("ACK") to the server 20 to confirm that the data was written. Hypervisor 22 may comprise software running on a virtual machine, and may have a splitter 28 comprising code running in the hypervisor that receives the data from the server to be written to the disks. The hypervisor splitter may duplicate (replicate) the data, send one copy of the data to the production storage disks 24, and send the other copy of the data to the replication virtual appliance 26 for transfer of the data to the remote disaster recovery site 14 via network 16. When the data is both received at the replication virtual appliance and stored on the local production disks 24, the splitter 28 may forward an acknowledgment from the disks to the server.

The data transferred from the replication virtual appliance 26 via the network 16 to the remote disaster recovery site 14 may be received by another replication virtual appliance 30 of the second computer system at the remote recovery site. Replication virtual appliance 30, which may also comprise a virtual machine processing system, may write the received data through a hypervisor 32 with a log journal entry to the remote recovery site disks 34 for storage on the disks.

Figure 2:
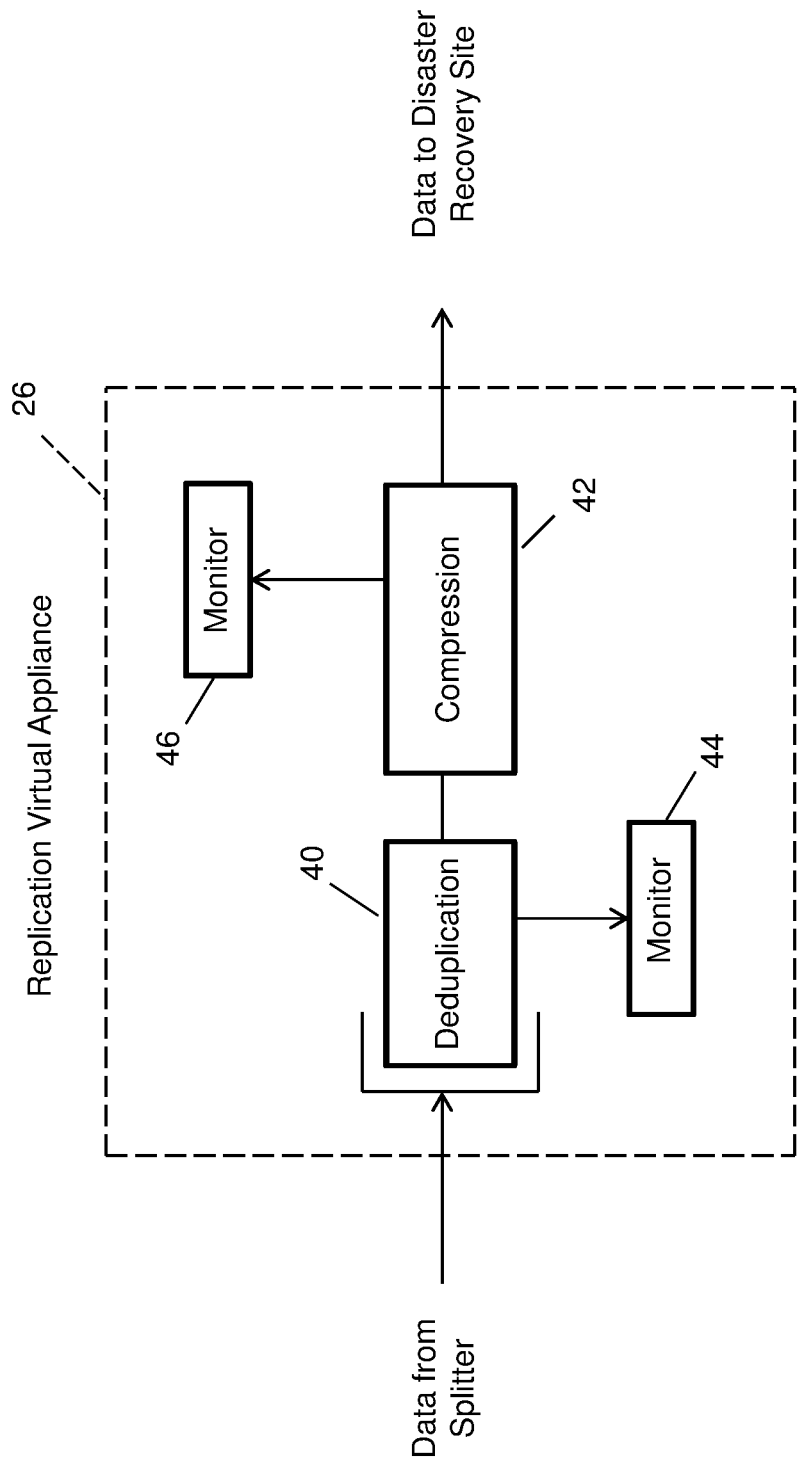
FIG. 2 is a block diagram illustrating an embodiment of a replication virtual appliance in accordance with the invention of the system of FIG. 1.

In addition to transferring replicated data from the splitter to the disaster recovery site, the replication virtual appliance 26 may also perform deduplication of the data to eliminate duplicate data and may compress the deduplicated data to reduce transmission bandwidth to the remote recovery site and storage requirements at the remote storage system. Referring to FIG. 2, the replication virtual appliance 26 may comprise a deduplication module 40 and a compression module 42 connected in series, as shown. The deduplication module 40 may comprise Dell/EMC RecoverPoint deduplication technology of the Assignee of the invention, and the compression module 42 may comprise standard well-known compression software available from any of a number of different sources.

In accordance with the invention, data from the server to be written to storage is first analyzed prior to being written, as will be described, to detect unintentional encryption which is an indication of a ransomware attack. This is an important function of the local replication virtual appliance 26 of the local production site. Upon detecting that a ransomware attack is occurring, the local replication virtual appliance may automatically take appropriate action such as issuing an alert and/or preventing the ransomware encrypted data from being written to remote storage and also possibly to local storage. To detect encryption, the local replication virtual appliance 26 may include a first monitor 44 connected to the deduplication module 40 for analyzing the data from the splitter following deduplication by module 40, and may include a second monitor 46 connected to the compression module 42 for analyzing deduplicated data from module 40 after compression by module 40. Monitors 44 and 46 are formed to detect malicious ransomware encryption, as will be described. The invention advantageously monitors and analyzes in real time all data writes which pass through the splitter 28 and which are sent to the local replication virtual appliance 26, where the data is analyzed, before the data is actually written to either production disks 24 or recovery disks 34. (Data sent to storage on a disk is typically not written immediately to the disk, but is instead written to a cache before it is actually written to the disk.)

The remote replication virtual appliance 30 at the remote recovery site receives the data from the local replication virtual appliance 26 of the local production site 12. It may handle the transmission protocol over the network 16, as well as network failures and errors. Additionally, it may perform the reverse decompression function on the compressed data before it is written to disks 34. Additionally, the local replication virtual appliance 26 may communicate with the remote virtual replication appliance 30 to determine whether a block exists at the remote site and whether data should be sent there. If a block exists, the remote virtual replication appliance may also copy data from an existing location to other remote storage.

As will be described, upon detecting ransomware, the invention may automatically prevent further data writes to the recovery storage disks so that a "clean" copy of the data can be maintained, but may not necessarily stop writes to the local storage. Stopping writes to the local production storage is very disruptive since it prevents production workloads from running and disrupts business operations. Furthermore, ransomware detection is probabilistic and may have misses. Thus, the invention may not necessarily prevent ongoing writes to the production storage upon detecting ransomware to maintain a "working" copy of the data in case the ransomware detection is a "false positive", i.e., the detection algorithm incorrectly detects ransomware in a situation that is not, in fact, ransomware but a legitimate operation. Stopping writes to the remote recovery storage is more acceptable since it does not disrupt production applications while still maintaining a clean copy at the remote site.

Figure 3:
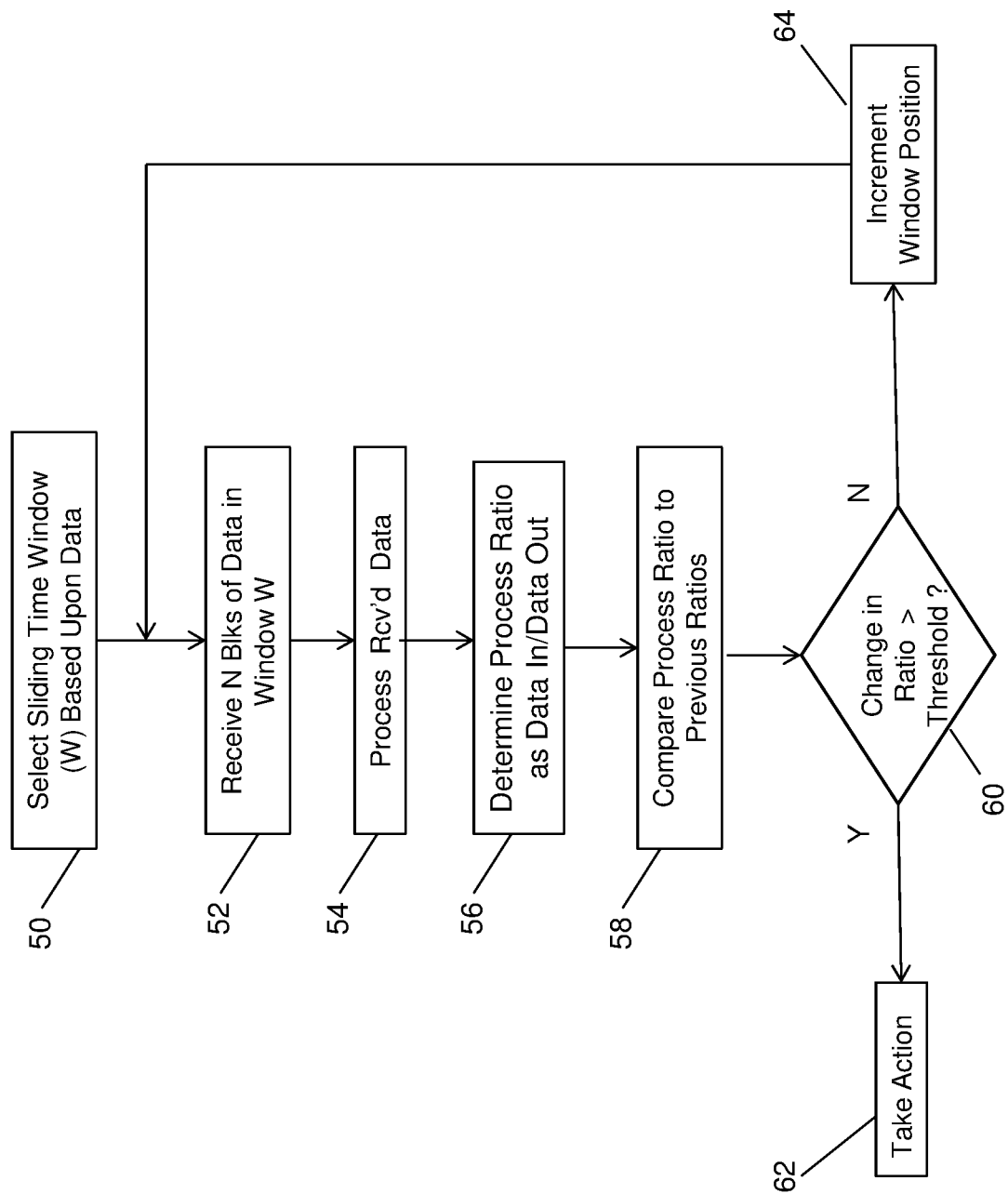
FIG. 3 is a flowchart of a process in accordance with the invention illustrating the operation of a monitor of the replication virtual appliance of FIG. 2.

FIG. 3 is a flowchart illustrating an overview of an embodiment of a ransomware detection process in accordance with the invention that may be employed by the monitors 44 and 46 to detect ransomware encryption. FIG. 3 shows specifically a ransomware detection process based upon analyzing the degree to which data may compressed, but a substantially similar process may be used for analyzing the degree to which data can be deduplicated to detect ransomware. Detection processes such as shown in FIG. 3 may comprise software executing on one or more virtual machines of the local replication virtual appliance.

Typically, data is deduplicated prior to being sent to a disk for writing to reduce storage requirements. Data is not usually written to disk compressed, but it may be compressed to improve its transmission efficiency and reduce bandwidth over the network. The deduplication and compression based ransomware detection processes employed by the monitors may be based upon the fact that encrypted data does not either compress well or deduplicate well. Thus, if ransomware starts encrypting data, the ability to compress the data and to deduplicate the data is significantly reduced. Thus, an abrupt change in compression ratio of the data may indicate that a ransomware attack is starting to encrypt the data. Similarly, an abrupt decrease in the deduplication ratio of the data is another indication of the possibility that ransomware is encrypting the data. As described below, in an embodiment, the invention may analyze the data contained within a sliding time window to detect abrupt changes in either or both of deduplication or compression to detect the probability of a ransomware attack. Other detection approaches are also possible, as will be described.

In an embodiment of the invention, FIG. 3 illustrates a process for detecting ransomware that may be performed by monitors 44 and 46. The process may comprise detecting changes in parameters of the data processed by the replication virtual appliance 26. The parameters may comprise one or both of the deduplication ratio of the input data deduplicated by deduplication module 40 and/or the compression ratio of data compressed by compression module 42. Other parameters may also be analyzed to detect ransomware, as will be described.

FIG. 3 illustrates an embodiment of a generic detection process that may be performed by monitor modules 44 and 46 for detecting changes in a "process" ratio for data "processed" by either or both of process modules 40 or 42. As will be described, the generic "process" illustrated in FIG. 3 may be either deduplication or compression. The detection process steps performed by the monitor modules may be substantially the same for either a deduplication or a compression "process". Only the parameters and values may be different.

The detection process of FIG. 3 may begin at 50 by selecting a sliding time window having a predetermined time span, T, corresponding to a desired number, N, blocks of data to be analyzed. The time span, T, of the window, and the number, N, of data blocks analyzed, may be selected based upon the type of data. At 52, a processing module (either 40 or 42 depending upon whether the process is deduplication or compression) may receive N blocks of unprocessed data from the sliding window, and process the received data at 54, e.g., compress the data. At 56, the monitor (44 or 46 as appropriate) connected to the module performing the processing may determine the processing ratio of the data processed by the module as the ratio, r, of (Data In)/(Data Out). The processing ratio will be either the deduplication ratio if the processing was deduplication, or the compression ratio if the processing was compression. The higher the ratio, the more the data was deduplicated or compressed. At 58, the current processing ratio as determined at 56 may be compared to one or more previously determined processing ratios for the same data stream to detect significant changes in the ratio. At 60 any change in current processing ratio from the previous ratios that is more than a predetermined threshold amount may be determined to significant. For instance, if the compression ratio for a data stream has previously been measured to be between 1.5-2.0, and the ratio suddenly drops to about 1.0, indicating little or no compression, that may be an indication of encryption and possible ransomware because encrypted data cannot be compressed as much as unencrypted data. Thus, if the change in ratio is more than the predetermined threshold, this is an indication of a possible ransomware attack and appropriate action may be taken at 62, as described in more detail in connection with FIG. 4. If the change in ratio is not greater than the threshold, meaning that the current ratio is approximately what it was previously, that may be taken as an indication that ransomware is not present. At 64 the sliding window may be then incremented to select new data and the detection process may return to step 52 and repeat. At 64, the sliding window may incremented by time span equal to T to select a completely new set of N data blocks for analysis, or it may increment by less than time span T so that the N data blocks selected for analysis is a mixture of both previously analyzed data and new data.

Significantly, by comparing the processing ratio of the data being processed to previous ratios of the same data stream, rather than to some arbitrary industry or selected standard, errors and false alarms due to variations in data types can be mitigated and a more accurate prediction of the presence of ransomware is afforded. Furthermore, by selecting the threshold appropriately, the sensitivity of the detection process may be controlled. For instance, the smaller the change in ratio that is selected as a threshold, the faster will be the detection process, but also the higher will be the false alarm rate.

Figure 4:
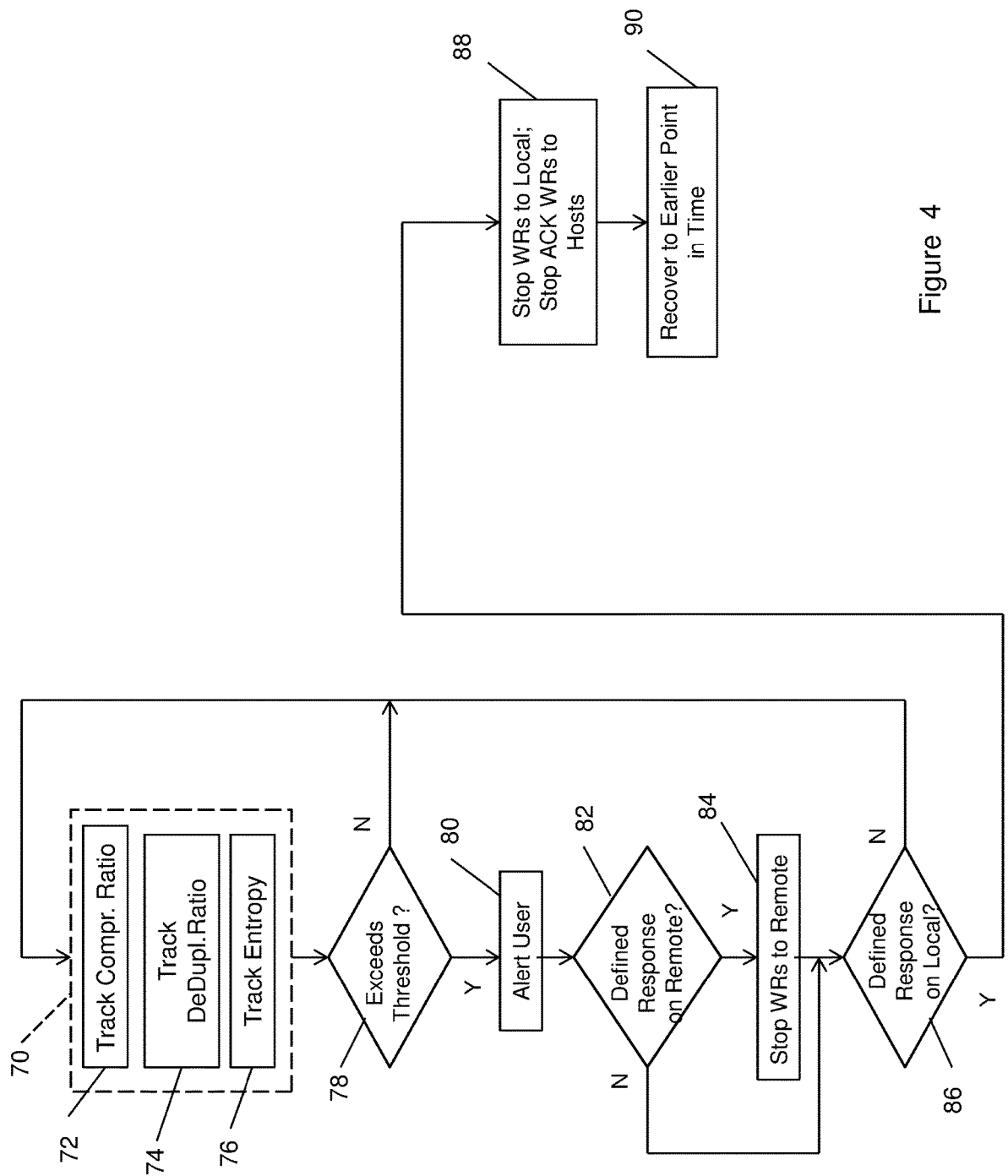
FIG. 4 is a flowchart illustrating an embodiment of a process in accordance with the invention for detecting and preventing ransomware.

FIG. 4 is a flowchart giving an overview of an embodiment of a detection and prevention process in accordance with the invention. At block 70, which corresponds, in part, to steps 50-58 of FIG. 3, the process may employ one or more of three different processes to detect the possibility of ransomware. These are processes 72 and 74 to track compression ratio and deduplication ratio, respectively, such as described above in connection with FIG. 3. In an embodiment, an additional process 76 may be included that tracks Shannon entropy to determine a measure of order in the data to detect data encryption. Process 76 may be a process such as described, for example, in U.S. Pat. No. 8,799,671 to Conte et al. At 78, it may be determined whether the changes measured by either one or a combination of these detection processes exceeds a predetermined threshold. If so, at 80 an alert may be given to a user. If they do not, then the process may return to step 70 and repeat with a next set of data blocks, as described above in connection with FIG. 3.

Next, at 82, upon detecting the possibility of ransomware, the process may determine whether there is a defined response applicable to the remote site. If so, at 84 the process may perform the defined response. The defined response may be, for example, to automatically stop writing changes to the data at the remote site. In this case, the virtual replication appliance may continue to receive data changes and write them to the log journal, but will not apply them to remote storage. This will contain the spread of the ransomware encryption within the remote copy of the data, and allow a faster recovery to an earlier point in time and faster restoration of normal operations.

At step 86 the process may determine whether there is a defined response applicable to the local production site. If not, the process returns to step 70 and repeats. If there is a defined response applicable to the local site, at 88 the process may perform the defined response. The response may comprise, for example, stopping writing changes to the local site and stopping acknowledgment ("ACK") writes to the hosts. Stopping ACKs prevents the hosts from writing to the disks, and causes them to declare a disk failure. This prevents business applications from working which can disrupt business operations, and, thus, is an extreme measure. However, it may be preferable to losing all of the data. Finally at 90, the system may enter a recovery phase. In the recovery phase, a user may take steps to remove the ransomware and to recover the system to an earlier point in time, as by replicating the clean system data using the remote data storage and the journal logs.

As will be appreciated from the foregoing, the invention affords an easy and convenient way of detecting and preventing ransomware in real time operations by simply focusing on a change in processing ratio over time as a key attribute that indicates the possibility of ransomware.

While the foregoing description has been with reference to particular embodiments of the invention, it will be appreciated the changes to these embodiments may be made without departing from the principles of the invention, the scope of which is defined by the appended claims.

The invention claimed is:

1. A method of detecting ransomware in a computer storage system having a server, a local production site having local storage, and a remote recovery site having remote storage, comprising:
    replicating data of a data write from the server to form a local copy of said data for said local storage and to form a remote copy of said data for said remote storage;
    inputting selected data of one of said copies to a process to transform said selected data into processed output data;
    determining a value of a process ratio comprising a ratio of said selected data input to said process divided by said processed output data;
    comparing said determined value of said process ratio with a previous process ratio value for data of said one copy to detect a change in said determined value of process ratio; and
    upon detecting said change in said value of said determined process ratio exceeding a predetermined threshold, identifying said change to be due to ransomware encryption of said data from the server.

2. The method of claim 1, wherein said processing comprises compressing said selected data, and said process ratio comprises a compression ratio representing an amount of compression of said selected data.

3. The method of claim 2, wherein said identifying comprises identifying said ransomware encryption upon detecting a decrease in said compression ratio that exceeds said predetermined threshold.

4. The method of claim 1, wherein said processing comprise deduplication of said selected data to remove redundant data, and said process ratio comprises a deduplication ratio of said selected data.

5. The method of claim 4, wherein said identifying comprises identifying said ransomware encryption upon detecting a decrease in said deduplication ratio that exceeds said predetermined threshold.

6. The method of claim 1, wherein said processing is applied to data of said remote copy prior to storage in said remote storage.

7. The method of claim 1 further comprising stopping writing of data to said remote storage upon detecting ransomware encryption.

8. The method of claim 1 further comprising stopping writing of data to said local storage upon detecting ransomware encryption.

9. The method of claim 1, wherein said selected data comprises a predetermined length of data selected by a sliding time window having a predetermined time length, and wherein the method further comprises incrementing said sliding window to select additional data, and repeating said method.

10. The method of claim 9, wherein said selected data comprises N blocks of data corresponding to said predetermined time length of said sliding window, and wherein said incrementing said sliding window comprises incrementing to select one of all new data or a mixture of new data and previously processed data.

11. A non-transitory storage medium storing executable instructions for controlling a processor to perform a method of detecting ransomware in a computer storage system having a server, a local production site having local storage, and a remote recovery site having remote storage, comprising:
    replicating data of a data write from the server to form a local copy of said data for said local storage and to form a remote copy of said data for said remote storage;
    inputting selected data of one of said copies to a process to transform said selected data into processed output data;
    determining a value of a process ratio comprising a ratio of said selected data input to said process divided by said processed output data;
    comparing said determined value of said process ratio with a previous process ratio value for data of said one copy to detect a change in said determined value of process ratio; and
    upon detecting said change in said value of said determined process ratio exceeding a predetermined threshold, identifying said change to be due to ransomware encryption of said data from the server.

12. The non-transitory storage medium of claim 11, wherein said processing comprises compressing said selected data, and said process ratio comprises a compression ratio representing an amount of compression of said selected data.

13. The non-transitory storage medium of claim 12, wherein said identifying comprises identifying said ransomware encryption upon detecting a decrease in said compression ratio that exceeds said predetermined threshold.

14. The non-transitory storage medium of claim 11, wherein said processing comprise deduplication of said selected data to remove redundant data, and said process ratio comprises a deduplication ratio of said selected data.

15. The non-transitory storage medium of claim 14, wherein said identifying comprises identifying said ransomware encryption upon detecting a decrease in said deduplication ratio that exceeds said predetermined threshold.

16. The non-transitory storage medium of claim 11, wherein said processing is applied to data of said remote copy prior to storage in said remote storage.

17. The non-transitory storage medium of claim 11 further comprising stopping writing of data to said remote storage upon detecting ransomware encryption.

18. The non-transitory storage medium claim 11 further comprising stopping writing of data to said local storage upon detecting ransomware encryption.

19. The non-transitory storage medium claim 11, wherein said selected data comprises a predetermined length of data selected by a sliding time window having a predetermined time length, and wherein the method further comprises incrementing said sliding window to select additional data, and repeating said method.

20. The non-transitory storage medium of claim 19, wherein said selected data comprises N blocks of data corresponding to said predetermined time length of said sliding window, and wherein said incrementing said sliding window comprises incrementing to select one of all new data or a mixture of new data and previously processed data.

\* \* \* \* \*